(12) United States Patent
Sundaram et al.

(10) Patent No.: US 7,883,638 B2
(45) Date of Patent: Feb. 8, 2011

(54) CONTROLLED RELEASE COOLING ADDITIVE COMPOSITIONS

(75) Inventors: Magesh Sundaram, Chicago, IL (US); David Alan Little, Newtown, PA (US)

(73) Assignee: Dober Chemical Corporation, Woodridge, IL (US)

( * ) Notice: Subject to any disclaimer, the term of this patent is extended or adjusted under 35 U.S.C. 154(b) by 299 days.

(21) Appl. No.: 12/154,900

(22) Filed: May 27, 2008

(65) Prior Publication Data

US 2009/0294725 A1  Dec. 3, 2009

(51) Int. Cl.
*C09K 5/00* (2006.01)

(52) U.S. Cl. .............................. 252/70; 252/71; 252/73; 252/180

(58) Field of Classification Search ........................ None
See application file for complete search history.

(56) References Cited

U.S. PATENT DOCUMENTS

| | | | |
|---|---|---|---|
| 2,280,792 A | 4/1942 | Bruson | |
| 2,754,330 A | 7/1956 | Schreyer | |
| 2,782,240 A | 2/1957 | Hefner et al. | |
| 2,841,479 A | 7/1958 | Hefner et al. | |
| 2,928,877 A | 3/1960 | Jaul et al. | |
| 2,955,028 A | 10/1960 | Bevans | |
| 3,087,436 A | 4/1963 | Dettlof et al. | |
| 3,094,133 A | 6/1963 | Treanor | |
| 3,172,892 A | 3/1965 | Le Suer et al. | |
| 3,215,707 A | 11/1965 | Rense | |
| 3,231,587 A | 1/1966 | Rense | |
| 3,242,051 A | 3/1966 | Hiestand et al. | |
| 3,272,746 A | 9/1966 | Le Suer et al. | |
| 3,275,554 A | 9/1966 | Wagenaar | |
| 3,336,223 A | 8/1967 | Kneeland | |
| 3,361,673 A | 1/1968 | Stuart et al. | |
| 3,368,972 A | 2/1968 | Otto | |
| 3,413,347 A | 11/1968 | Worrel | |
| 3,422,157 A | 1/1969 | Kaufman et al. | |
| 3,438,757 A | 4/1969 | Honnen et al. | |
| 3,440,029 A | 4/1969 | Little et al. | |
| 3,454,555 A | 7/1969 | van der Voort et al. | |
| 3,454,607 A | 7/1969 | Le Suer et al. | |
| 3,505,244 A | 4/1970 | Cesna | |
| 3,565,804 A | 2/1971 | Honnen et al. | |
| 3,574,576 A | 4/1971 | Honnen et al. | |
| 3,598,738 A | 8/1971 | Biswell et al. | |
| 3,615,024 A | 10/1971 | Michaels | |
| 3,646,178 A | 2/1972 | Traubel et al. | |
| 3,649,229 A | 3/1972 | Otto | |
| 3,671,511 A | 6/1972 | Honnen et al. | |
| 3,697,574 A | 10/1972 | Piasek et al. | |
| 3,715,037 A | 2/1973 | Shin-En Hu | |
| 3,725,277 A | 4/1973 | Worrel | |
| 3,726,882 A | 4/1973 | Traise et al. | |
| 3,749,247 A | 7/1973 | Rohde | |
| 3,754,741 A | 8/1973 | Whitehurst et al. | |
| 3,755,433 A | 8/1973 | Miller et al. | |
| 3,756,793 A | 9/1973 | Robinson | |
| 3,790,359 A | 2/1974 | Feldman | |
| 3,822,289 A | 7/1974 | Clark et al. | |
| 3,849,085 A | 11/1974 | Kreuz et al. | |
| 3,852,224 A | 12/1974 | Bridgeford | |
| 3,853,601 A | 12/1974 | Taskier | |
| 3,877,899 A | 4/1975 | Bundy et al. | |
| 3,880,569 A | 4/1975 | Bannister et al. | |
| 3,911,193 A | 10/1975 | Resz et al. | |
| 3,912,764 A | 10/1975 | Palmer, Jr. | |
| 3,932,537 A | 1/1976 | Wetzel et al. | |
| 3,954,808 A | 5/1976 | Elliott et al. | |
| 3,960,757 A | 6/1976 | Morishita et al. | |
| 3,977,992 A | 8/1976 | Hofacker | |
| 3,980,589 A | 9/1976 | Murrell et al. | |
| 3,999,960 A | 12/1976 | Langer, Jr. et al. | |
| 4,026,809 A | 5/1977 | Lachowicz et al. | |
| 4,032,700 A | 6/1977 | Song et al. | |
| 4,066,559 A | 1/1978 | Rohde | |
| 4,075,097 A | 2/1978 | Paul | |
| 4,075,098 A | 2/1978 | Paul et al. | |
| 4,110,349 A | 8/1978 | Cohen | |

(Continued)

FOREIGN PATENT DOCUMENTS

EP  0279863  8/1988

(Continued)

OTHER PUBLICATIONS

English language abstract of European Patent 0476485 obtained from esp@cenet website—espacenet.com.

(Continued)

*Primary Examiner*—Necholus Ogden, Jr.
(74) *Attorney, Agent, or Firm*—Stout, Uxa, Buyan & Mullins; Frank J. Uxa

(57) ABSTRACT

A controlled release additive composition for use in aqueous coolant systems is disclosed and comprises a core containing at least one additive component and a polymeric coating including one or more defined polymers substantially surrounding the core. The controlled released additive composition slowly releases the additive component into the aqueous coolant of an open, circulating cooling water system, thereby delivering an effective concentration level of the additive component over an extended period.

10 Claims, No Drawings

U.S. PATENT DOCUMENTS

| | | | |
|---|---|---|---|
| 4,125,382 A | 11/1978 | O'Brien et al. | |
| 4,129,421 A | 12/1978 | Webb | |
| 4,137,185 A | 1/1979 | Gardiner et al. | |
| 4,156,061 A | 5/1979 | Pappas et al. | |
| 4,214,994 A | 7/1980 | Kitano et al. | |
| 4,222,746 A | 9/1980 | Sweeney et al. | |
| 4,231,759 A | 11/1980 | Udelhofen et al. | |
| 4,234,435 A | 11/1980 | Meinhardt et al. | |
| 4,238,628 A | 12/1980 | Cahill et al. | |
| 4,247,301 A | 1/1981 | Honnen | |
| 4,261,704 A | 4/1981 | Langdon | |
| 4,265,748 A | 5/1981 | Villani et al. | |
| 4,272,294 A | 6/1981 | Jaunarajs | |
| 4,294,586 A | 10/1981 | Cox, Jr. | |
| 4,320,019 A | 3/1982 | Hayashi | |
| 4,323,714 A | 4/1982 | Malloy et al. | |
| 4,326,972 A | 4/1982 | Chamberlin, III | |
| 4,357,250 A | 11/1982 | Hayashi | |
| 4,365,973 A | 12/1982 | Irish | |
| 4,379,065 A | 4/1983 | Lange | |
| 4,460,379 A | 7/1984 | Sweeney et al. | |
| 4,469,908 A | 9/1984 | Burress | |
| 4,515,740 A | 5/1985 | Schuettenberg et al. | |
| 4,561,981 A | 12/1985 | Characklis | |
| 4,639,255 A | 1/1987 | Schuettenberg et al. | |
| 4,658,078 A | 4/1987 | Slaugh et al. | |
| 4,663,063 A | 5/1987 | Davis | |
| 4,668,834 A | 5/1987 | Rim et al. | |
| 4,673,527 A | 6/1987 | Goudy, Jr. et al. | |
| 4,692,314 A | 9/1987 | Etani et al. | |
| 4,708,809 A | 11/1987 | Davis | |
| 4,717,495 A | 1/1988 | Hercamp et al. | |
| 4,728,452 A | 3/1988 | Hansen | |
| 4,738,897 A | 4/1988 | McDougall et al. | |
| 4,740,321 A | 4/1988 | Davis et al. | |
| 4,755,189 A | 7/1988 | Feldman | |
| 4,756,844 A | 7/1988 | Walles et al. | |
| 4,782,891 A | 11/1988 | Cheadle et al. | |
| 4,849,569 A | 7/1989 | Smith, Jr. | |
| 4,857,073 A | 8/1989 | Vataru et al. | |
| 4,862,908 A | 9/1989 | Payer | |
| 4,892,562 A | 1/1990 | Bowers et al. | |
| 4,904,401 A | 2/1990 | Ripple et al. | |
| 4,937,299 A | 6/1990 | Ewen et al. | |
| 4,980,075 A | 12/1990 | Dobrez et al. | |
| 4,981,602 A | 1/1991 | Ripple et al. | |
| 5,019,669 A | 5/1991 | Adams et al. | |
| 5,032,259 A | 7/1991 | He et al. | |
| 5,050,549 A | 9/1991 | Sturmon | |
| 5,053,152 A | 10/1991 | Steckel | |
| 5,059,217 A | 10/1991 | Arroyo et al. | |
| 5,071,919 A | 12/1991 | DeGonia et al. | |
| 5,089,041 A | 2/1992 | Thompson et al. | |
| 5,094,666 A | 3/1992 | Feldman et al. | |
| 5,120,349 A | 6/1992 | Stewart et al. | |
| 5,137,978 A | 8/1992 | Degonia et al. | |
| 5,137,988 A | 8/1992 | Matzner et al. | |
| 5,160,648 A | 11/1992 | Steckel | |
| 5,186,732 A | 2/1993 | Thompson et al. | |
| 5,192,335 A | 3/1993 | Cherpeck | |
| 5,230,714 A | 7/1993 | Steckel | |
| 5,235,936 A | 8/1993 | Kracklauer | |
| 5,249,552 A | 10/1993 | Brooks | |
| 5,286,823 A | 2/1994 | Rath | |
| 5,296,154 A | 3/1994 | Steckel | |
| 5,300,701 A | 4/1994 | Cherpeck | |
| 5,324,800 A | 6/1994 | Welborn, Jr. et al. | |
| 5,332,407 A | 7/1994 | Herbstman | |
| 5,336,278 A | 8/1994 | Adams et al. | |
| 5,337,705 A | 8/1994 | Lane | |
| 5,346,965 A | 9/1994 | Dever et al. | |
| 5,368,615 A | 11/1994 | Steckel | |
| 5,372,942 A | 12/1994 | McGarrity et al. | |
| 5,407,594 A | 4/1995 | Fry et al. | |
| 5,408,018 A | 4/1995 | Rath | |
| 5,435,346 A | 7/1995 | Tregidgo et al. | |
| 5,456,217 A | 10/1995 | Thunker et al. | |
| 5,458,793 A | 10/1995 | Adams et al. | |
| 5,472,712 A | 12/1995 | Oshlack et al. | |
| 5,483,327 A | 1/1996 | Taya et al. | |
| 5,496,383 A | 3/1996 | Franz et al. | |
| 5,507,942 A | 4/1996 | Davis | |
| 5,508,356 A | 4/1996 | Dever et al. | |
| 5,527,452 A | 6/1996 | Grigoriev et al. | |
| 5,565,106 A | 10/1996 | Sherbondy et al. | |
| 5,567,845 A | 10/1996 | Franz et al. | |
| 5,573,557 A | 11/1996 | Thünker et al. | |
| 5,580,359 A | 12/1996 | Wright | |
| 5,585,050 A | 12/1996 | Jorda et al. | |
| 5,591,330 A | 1/1997 | Lefebvre | |
| 5,620,949 A | 4/1997 | Baker et al. | |
| 5,643,351 A | 7/1997 | Lew et al. | |
| 5,662,799 A | 9/1997 | Hudgens et al. | |
| 5,662,803 A | 9/1997 | Young | |
| 5,662,808 A | 9/1997 | Blaney et al. | |
| 5,663,457 A | 9/1997 | Kolp | |
| 5,670,059 A | 9/1997 | Jones et al. | |
| 5,674,950 A | 10/1997 | Thaler | |
| 5,691,422 A | 11/1997 | Emert et al. | |
| 5,695,531 A | 12/1997 | Makino et al. | |
| 5,696,060 A | 12/1997 | Baker et al. | |
| 5,696,067 A | 12/1997 | Adams et al. | |
| 5,711,894 A | 1/1998 | Miyake et al. | |
| 5,718,836 A | 2/1998 | Nakatani et al. | |
| 5,739,356 A | 4/1998 | Dietz et al. | |
| 5,741,433 A | 4/1998 | Mitchell et al. | |
| 5,752,989 A | 5/1998 | Henly et al. | |
| 5,752,991 A | 5/1998 | Plavac | |
| 5,756,435 A | 5/1998 | Carey et al. | |
| 5,772,873 A | 6/1998 | Hudgens et al. | |
| 5,777,041 A | 7/1998 | Emert et al. | |
| 5,777,142 A | 7/1998 | Adams et al. | |
| 5,780,554 A | 7/1998 | Emert et al. | |
| 5,786,490 A | 7/1998 | Dietz et al. | |
| 5,803,024 A | 9/1998 | Brown | |
| 5,808,643 A | 9/1998 | Tracy et al. | |
| 5,829,976 A | 11/1998 | Green | |
| 5,833,722 A | 11/1998 | Davies et al. | |
| 5,840,920 A | 11/1998 | Baker | |
| 5,856,524 A | 1/1999 | Dietz et al. | |
| 5,880,219 A | 3/1999 | Thaler et al. | |
| 5,897,770 A | 4/1999 | Hatch et al. | |
| 5,919,869 A | 7/1999 | Thaler et al. | |
| 5,948,248 A | 9/1999 | Brown | |
| 6,004,582 A | 12/1999 | Faour et al. | |
| 6,010,639 A | 1/2000 | Mitchell et al. | |
| 6,017,369 A | 1/2000 | Ahmed | |
| 6,020,500 A | 2/2000 | Baker et al. | |
| 6,074,445 A | 6/2000 | Ahmed | |
| 6,114,547 A | 9/2000 | Baker et al. | |
| 6,140,541 A | 10/2000 | Melder et al. | |
| 6,183,524 B1 | 2/2001 | Ahmed | |
| 6,238,554 B1 | 5/2001 | Martin, Jr. | |
| RE37,369 E | 9/2001 | Hudgens et al. | |
| 6,827,750 B2 | 12/2004 | Drozd et al. | |
| 6,835,218 B1 | 12/2004 | Drozd et al. | |
| 6,860,241 B2 | 3/2005 | Martin et al. | |
| 6,878,309 B2 * | 4/2005 | Blakemore et al. | 252/181 |
| 6,919,023 B2 | 7/2005 | Merritt et al. | |
| 7,001,531 B2 | 2/2006 | Chen et al. | |
| 7,138,139 B2 | 11/2006 | Gauthier et al. | |
| 2003/0053927 A1 | 3/2003 | Drozd et al. | |
| 2007/0000831 A1 | 1/2007 | Kelly et al. | |
| 2007/0158292 A1 | 7/2007 | Clark et al. | |

| | | | |
|---|---|---|---|
| 2007/0241042 | A1 | 10/2007 | Martin et al. |
| 2007/0280981 | A1 | 12/2007 | Birthisel et al. |

FOREIGN PATENT DOCUMENTS

| | | |
|---|---|---|
| EP | 0448365 | 9/1991 |
| EP | 0476485 | 3/1992 |
| EP | 0516838 | 12/1992 |
| EP | 0573578 | 12/1993 |

OTHER PUBLICATIONS

Kelly et al., U.S. Appl. No. 12/154,955, filed May 27, 2008.
Kelly et al., U.S. Appl. No. 12/154,899, filed May 27, 2008.
Kelly et al., U.S. Appl. No. 12/154,898, filed May 27, 2008.
Sundaram et al., U.S. Appl. No. 61/130,072, filed May 27, 2008.
Kelly et al., U.S. Appl. No. 10/701,133, filed Nov. 3, 2003.
Kelly et al., U.S. Appl. No. 11/516,150, filed Sep. 5, 2006.
USPTO Office Action dated Dec. 19, 2002 in U.S. Appl. No. 09/939,214, filed Aug. 24, 2001.
USPTO Office Action dated Jul. 1, 2003 in U.S. Appl. No. 09/939,214, filed Aug. 24, 2001.
USPTO Office Action dated Sep. 25, 2003 in U.S. Appl. No. 09/939,214, filed Aug. 24, 2001.
USPTO Office Action dated Jan. 25, 2006 in U.S. Appl. No. 10/701,133, filed Nov. 3, 2003.
USPTO Office Action dated May 3, 2006 in U.S. Appl. No. 10/701,133, filed Nov. 3, 2003.
USPTO Office Action dated Dec. 16, 2008 in U.S. Appl. No. 11/516,150, filed Sep. 5, 2006.
USPTO Office Action dated Mar. 28, 2005 in U.S. Appl. No. 10/365,097, filed Feb. 12, 2003.
USPTO Office Action dated Aug. 16, 2005 in U.S. Appl. No. 10/365,097, filed Feb. 12, 2003.
USPTO Office Action dated Mar. 23, 2007 in U.S. Appl. No. 10/930,417, filed Aug. 31, 2004.
USPTO Office Action dated Sep. 21, 2007 in U.S. Appl. No. 10/930,417, filed Aug. 31, 2004.
USPTO Office Action dated Dec. 7, 2007 in U.S. Appl. No. 10/930,417, filed Aug. 31, 2004.
USPTO Office Action dated Mar. 17, 2008 in U.S. Appl. No. 10/930,417, filed Aug. 31, 2004.
USPTO Office Action dated Sep. 5, 2008 in U.S. Appl. No. 10/930,417, filed Aug. 31, 2004.
USPTO Office Action dated Mar. 27, 2002 in U.S. Appl. No. 09/781,842, filed Feb. 12, 2001.
USPTO Office Action dated Oct. 8, 2002 in U.S. Appl. No. 09/781,842, filed Feb. 12, 2001.
USPTO Office Action dated Mar. 14, 2003 in U.S. Appl. No. 09/781,842, filed Feb. 12, 2001.
USPTO Office Action dated Jun. 5, 2003 in U.S. Appl. No. 09/781,842, filed Feb. 12, 2001.
USPTO Office Action dated Jan. 6, 2004 in U.S. Appl. No. 09/781,842, filed Feb. 12, 2001.
USPTO Office Action dated Mar. 31, 2004 in U.S. Appl. No. 09/781,842, filed Feb. 12, 2001.
International Search Report and Written Opinion mailed Aug. 19, 2009 in PCT Application No. PCT/US09/03228.
International Search Report and Written Opinion mailed Aug. 27, 2009 in PCT Application No. PCT/US09/03227.
International Search Report and Written Opinion mailed Aug. 27, 2009 in PCT Application No. PCT/US09/03236.

* cited by examiner

CONTROLLED RELEASE COOLING ADDITIVE COMPOSITIONS

FIELD OF THE INVENTION

The present invention relates to controlled release additive compositions for use in aqueous systems, particularly cooling systems, and to methods of using controlled release additive compositions. More particularly, the invention relates to controlled release additive compositions containing at least one water treatment chemical or additive and a controlled release material which slows the release of the water treatment chemical or additive into the aqueous system, thereby delivering an effective level of the water treatment chemical or additive to the aqueous system over an extended period.

BACKGROUND OF THE INVENTION

Traditionally, additives such as anti-foulants, anti-scaling agents, corrosion inhibitors, buffering and pH agents, microbiocides and the like are added directly to the solutions of aqueous systems as needed to prevent scale deposition, corrosion of metal surfaces and similar fouling of the aqueous systems, as well to maintain proper pH levels. As used herein, an aqueous system may include, without limitation, a cooling system, an open circulating cooling water system and an engine cooling system. Also, as used herein, a "system" includes at least a circulating solution. For example, a system may include a circulating solution, pump, tubing, etc.

In certain aqueous systems, it is important to maintain a steady level of additives. For example, the presence of microbiocides is especially important in an aqueous system such as cooling systems employed in cooling towers. Cooling towers usually maintain a cooling system for a considerable length of time. Typically, such cooling systems do not have sufficient aeration and exposure to sunlight to prevent microbial, especially bacterial and fungal, growth. In particular, many cooling systems use fill composed of synthetic polymer or other materials, for example, corrugated polyvinyl chloride and the like materials, in order to extend the amount of heat exchange surface area.

This type of construction greatly aggravates the problem of microbiological growth, since it provides an ideal physical environment for the propagation of troublesome microbes. If left untreated, such microorganisms may flourish and produce colonies extensive enough to give rise to problems of biofilm blockage of heat exchange surfaces, as well as clogging of the components of the water transporting apparatus used in operating the aqueous system.

Various methods of introducing additive to an aqueous system have been developed. For instance, a solid additive material may be added directly to the aqueous system which dissolves in the aqueous system. However, this method cannot maintain a steady concentration level of additive within the system. Initially, there would be a high level of the additives released into the system, and within a short time the additives are depleted. Additionally, a significant draw back of this method is the danger of overdosing the system with particular additives which are initially released. The overdosing is dangerous in that it can result in erosion and corrosion problems.

Various attempts have been made in the prior art to address particular water treatment systems by using controlled release coatings. For example, Characklis in U.S. Pat. No. 4,561,981 (issued Dec. 31, 1985) disclosed a method for controlling, preventing or removing fouling deposits, particularly in pipelines, storage tanks and the like by microencapsulating fouling control chemicals in a slow release coating. The coating material is described as being any material compatible with the fouling control chemical which is capable of sticking to the fouling deposit site. However, the coating materials as disclosed by Characklis may dissolve in a cooling system and create further corrosion problems.

Mitchell et al. in U.S. Pat. No. 6,010,639 disclosed using various polymers as coatings for coolant additives. Also, Blakemore et al. in U.S. Pat. No. 6,878,309 disclosed that copolymers derived from two different ethylenically unsaturated monomers may be used as coatings for coolant additives.

There continues to be a need for new controlled release cooling treatment compositions.

SUMMARY OF THE INVENTION

Accordingly, the present invention provides new controlled release additive compositions for coolant or cooling systems. This invention provides for delayed, sustained, controlled and/or more effective release of additive components. Such release may be effective in maintaining a consistent and/or effective level of additive components in the coolant or cooling system over an extended period of time. Preferably, the additive components comprise additives. As used herein, the term "additive" includes all materials which can be compounded or admixed with the additive compositions and which impart beneficial properties to the aqueous system. For example, an additive may comprise a microbiocide that is compatible with aqueous systems.

More particularly, the present invention provides a controlled release additive composition for cooling systems, preferably open circulating cooling water systems, for example, open circulating cooling water systems of cooling towers.

In one broad aspect of the present invention, controlled release additive compositions for use in open circulating cooling water systems are provided. Such compositions comprise a core comprising an additive component effective in treating an aqueous coolant in an open circulating cooling water system; and a coating comprising a defined polymeric component substantially surrounding the core and effective to slow the release of the additive component into an aqueous coolant in the open circulating cooling water system. Such slowing is relative to the release rate of the additive component in the aqueous coolant from a substantially identical composition without the coating.

In one embodiment, the core contains a water-soluble cooling additive component.

In one very useful embodiment, the coating comprises a polymeric component selected from polymers including units from vinyl acetate, ethylene and vinyl chloride, and combinations thereof, that is combinations of such polymers.

In another very useful embodiment, the coating comprises a polymeric component selected from polymers including units from vinyl acetate; an acrylate ester including, for example, lower alkyl, for example, alkyl having from 1 to about 6 carbon atoms, acrylate and methacrylate esters, such as butyl acrylate, butyl methacrylate and the like; and at least one monomer selected from vinyl neopentanoate, vinyl neohexanoate, vinyl neoheptanoate, vinyl neooctanoate, vinyl neononanoate and vinyl neoundecanoate. Combinations of such polymers can be employed and are included within the scope of the present invention. Such polymeric components including units selected from one of vinyl neononanoate, vinyl undecanoate and vinyl neopentanoate may be employed.

Combinations of the polymeric components disclosed in the immediately preceding two paragraphs can be included in the same coating, and such embodiments are included within the scope of the present invention.

The additive component has at least one active ingredient effective in treating an aqueous coolant of an open circulating cooling water system. Such active ingredients may include, without limitation, microbiocides, buffering components, cavitation liner pitting inhibitors, metal corrosion and hot surface corrosion inhibitors, defoaming agents, hot surface deposition, scale inhibitors, dispersant agents, surfactants and combinations, meaning to include mixtures, thereof.

Methods of using such compositions are provided and are included within the scope of the present invention. For example, methods of releasing an additive component or composition into an open circulating cooling water system, for example, and without limitation, of a cooling tower, comprises placing a controlled release additive composition, as described herein, in contact with an aqueous coolant present in an open circulating cooling water system.

Any feature or combination of features described herein are included within the scope of the present invention provided that the features included in any such combination are not mutually inconsistent as will be apparent from the context, this specification, and the knowledge of one of ordinary skill in the art. In addition, any feature or combination of features may be specifically excluded from any embodiment of the present invention.

DETAILED DESCRIPTION OF THE INVENTION

The present invention relates to controlled release additive compositions for use in aqueous systems. The aqueous system may be a cooling system, such as a circulating cooling water system, for example, an open circulating cooling water systems. In a preferred embodiment, the additive compositions are used in an open circulating cooling water system of cooling towers.

The present controlled release additive compositions comprise a core containing an additive component and a coating substantially surrounding or encapsulating the core which enables the slow release of the additive component into the open circulating cooling water system.

In one embodiment, the coating comprises a polymeric component selected from (1) polymers including units, for example, repeating units, from vinyl acetate, ethylene, and vinyl chloride, (2) polymers including units, for example, repeating units from vinyl acetate, an acrylate ester, and at least one monomer selected from vinyl neopentanoate, vinyl neohexanoate, vinyl neoheptanoate, vinyl neooctanoate, vinyl neononanoate and vinyl neoundecanoate.

Polymers including units from vinyl acetate, ethylene and vinyl chloride have been found to be useful in the present invention.

Such polymers exhibit a viscosity low enough for coating processing without difficulties, for example about 300 to about 800 cps, have a glass transition temperature, $T_g$, sufficiently low, for example about 0° C. or lower, to facilitate forming a good coating, are provided in a fine to medium particle size for example, about 0.1 to about 0.5 micron, such as 0.17 micron in diameter forms elastic coatings, and are insoluble and stable in coolants at operating conditions of the present compositions.

The presently useful polymers including units from vinyl acetate, ethylene and vinyl chloride can be made using conventional and well known techniques. Therefore, such manufacturing techniques are not described in detail herein. In one embodiment, the polymer may be a water-based emulsion polymer. These polymers may vary in composition. For example, such polymers may include about 1% or less to about 50% or more by weight of units from vinyl acetate; about 1% or less to about 50% or more by weight of units from ethylene; and about 1% or less to about 50% or more by weight of units from vinyl chloride.

In a particularly useful embodiment, the coating comprises a water-based emulsion vinyl acetate-ethylene-vinyl chloride terpolymer, for example, such as sold under the trademark Airflex 728 by Air Products and Chemicals, Inc., Allentown, Pa., U.S.A.

Another group of suitable polymers for use in the present coatings are the polymers, such as terpolymers, including units from vinyl acetate, acrylate esters, including, for example, lower alkyl, such as alkyl containing 1 to about 6 carbon atoms, acrylates and lower alkyl methacrylates, and at least one of certain vinyl neoalkanoates. As used herein, the term "lower alkyl" includes methyl, ethyl, propyl, butyl, pentyl, hexyl and the like.

In one useful embodiment, a polymer included in the coating is made up of a polymer, for example, a terpolymer, including units from vinyl acetate, butyl acrylate and at least one of vinyl neopentanoate, vinyl neohexanoate, vinyl neoheptanoate, vinyl neooctanoate, vinyl neononanoate and vinyl neoundecanoate. The vinyl neoalkanoate monomer may be vinyl neopentanoate. In another embodiment, the vinyl neoalkanoate monomer is vinyl neononanoate. In a further embodiment, the vinyl neoalkanoate monomer is vinyl neoundecanoate.

The presently useful vinyl neoalkanoates may be produced using conventional and/or well known techniques. Therefore, such production techniques are not described in detail herein. A number of the presently useful vinyl neoalkanoates are commercially available. For example, vinyl neoundecanoate is sold under the trademark VEOVA 11 by Shell Chemicals; vinyl neononanoate is sold under the trademark VEOVA 9 by Shell Chemicals; and vinyl neopentanoate is sold under the trademark VEOVA 5 by Shell Chemicals.

The presently useful polymers, for example, terpolymers, including units of vinyl acetate, at least one lower alkyl acrylate ester, and at least one of the vinyl neoalkanoates set forth herein can be made using conventional and well known techniques. Therefore, such manufacturing techniques are not described in detail herein. These polymers may vary in composition. For example, such polymers may include about 1% or less to about 50% or more by weight of units from vinyl acetate; about 1% or less to about 50% or more by weight of units from alkyl acrylate esters; and about 1% or less to about 50% or more by weight of units from the neoalkanoates set forth herein. In one embodiment, such polymer may be a water-based emulsion polymer.

In a preferred embodiment, an active polymer solid, for example, an active terpolymer solid, such as a polymer including units from at least one vinyl neoalkanoate, is provided in a dispersion including about 50% to about 57% or about 60% by weight of active polymer solid. Additionally, a surfactant may also be added to stabilize the dispersion.

The additive component may comprise a mixture of conventional inhibiting and buffering agents typically used in aqueous systems, preferably cooling systems, more preferably open circulating cooling water systems. In one embodiment, the additive component comprises (1) a buffering component to maintain a neutral or alkaline pH, including for example, alkali metal salts or sodium phosphates, borates and the like, (2) a liner pitting inhibitor component, including for example, alkali metal or sodium nitrites, molybdates and the like, (3) a metal corrosion and hot surface corrosion inhibitor component, including for example, alkali metal, salts of nitrates, nitrates and silicates, carboxylic acids, phosphonic acids, phosphonate, pyrophosphate, azoles, sulfonic acids, mercaptobenzothiazoles, metal dithiophosphates and metal dithiocarbonates (one particular corrosion inhibitor that has been found to be highly satisfactory and is preferred is a phenolic anti-oxidant, 4,4'-methylenebis(2,6-di-tertbutylphenol) that is commercially available under the trademark Ethyl 702 manufactured by Ethyl Corporation), and the like, (4) a defoaming agent component including for example, silicone defoamers, alcohols such as polyethoxylated glycol, polypropoxylated glycol or acetylenic glycols and the like, (5) a hot surface deposition and scale inhibitor component including for example, phosphate esters, phosphino carboxylic acid, polyacrylates, styrene-maleic anhydride copolymers, sulfonates and the like, (6) a dispersing component, including for example, non-ionic and/or anionic surfactants such as phosphate esters, sodium alkyl sulfonates, sodium aryl sulfonates, sodium alkylaryl sulfonates, linear alkyl benzene sulfonates, alkylphenols, ethoxylated alcohols, carboxylic esters and the like, (7) an organic acid, including for example adipic acid, sebacic acid and the like, (8) an anti-gel such as that disclosed by Feldman et al in U.S. Pat. No. 5,094,666, the content of which is incorporated in its entirety herein by reference (for example, such anti-gel additive comprises copolymers of ethylene and vinyl esters of fatty acids with molecular weight of 500-50,000; or Tallow amine salt of phthalic anhydride, used at 0.01-0.2%; or Tallow amine salt of dithio benzoic acid, used at 0.005-0.15%; or 4-hydroxy, 3,5-di-t-butyl dithiobenzoic acid; or ethylene-vinyl acetate copolymers) and/or microbiocides, preferably microbiocides used in open circulating cooling water systems of open circulating water cooling tower systems.

Other additive components contain a mixture of one or more of the components provided in the following Table 1. The possible functions identified are intended to be exemplary, not limiting.

TABLE 1

| COMPONENT | POSSIBLE FUNCTION | RANGE % |
| --- | --- | --- |
| Alkali metal or Ammonium phosphates | corrosion inhibitor/ buffering agent | 0-80 |
| Alkali metal or ammonium phosphonate | corrosion inhibitor/ buffering agent | 0-80 |
| Alkali metal or ammonium pyrophosphate | corrosion inhibitor/ buffering agent | 0-80 |
| Alkali metal or ammonium borate | corrosion inhibitor/ buffering agent | 0-80 |
| Alkali metal or ammonium nitrites | cavitation liner pitting/corrosion inhibitor | 4-60 |
| Alkali metal or ammonium molybdates | cavitation liner pitting/corrosion inhibitor | 4-60 |
| Alkali metal or ammonium nitrates | corrosion inhibitor | |
| Alkali metal or ammonium silicates | corrosion inhibitor | 0-40 |
| Alkali metal or ammonium salts of one or more neutralized dicarboxylic acids | corrosion inhibitor | 1-15 |
| Tolyltriazole | corrosion inhibitor | 1-15 |
| Dispersants (e.g. polyacrylic acid, phosphino carboxylic acid, phosphate esters, styrene-maleic anhydride copolymers, polmaleic acid, sulfonates and sulfonate copolymers) | deposition and scale | 0-15 |

TABLE 1-continued

| COMPONENT | POSSIBLE FUNCTION | RANGE % |
| --- | --- | --- |
| Defoamers (e.g. silicones, polyethoxylated glycol, polypropoxylated glycol, and acteylenic glycols) | foam inhibitor | 0-3 |

In one embodiment, the additive component includes nitrite compounds. In a preferred embodiment, the additive component includes a mixture of nitrite compounds and molybdate compounds to maintain a minimum concentration level of about 800 ppm of nitrite or a mixture of nitrite and molybdate in the cooling system, with the proviso that the minimum level of nitrite in the cooling system is about 400 ppm. Such additive is sold by Cummins Filtration under the trademark DCA-2+, which includes borate, silicate, organic acids, tolytriazole, scale inhibitors, surfactants and defoamers, in addition to nitrite and molybdate.

In one embodiment, the additive component includes a mixture of nitrite, nitrate and molybdate compounds. In a more preferred embodiment, the additive component comprises nitrite, nitrate, phosphate, silicate, borate, molybdate, tolyltriazole, organic acids, scale inhibitors, surfactants and defoamer. Such an additive is sold by Cummins Filtration under the trademark DCA-4+.

The additive component may be in solid, granular or particulate form provided that it does not decompose or melt at processing temperatures. Preferably, the additive component is molded in the form of a pellet or tablet which may have either a spherical or irregular shape. The additive pellet or tablet should be of sufficient size to provide the steady controlled release of the additive components into the cooling system over the desired period of time. Further, when the additive pellet or tablet is used in a filtering environment, it should be larger than the pores or orifices of the filter. Generally, a spherical pellet or tablet should have a diameter on the order of from about 1/32" to about 5.0", preferably from about 2/32" to about 3", more preferably from about 1/8" to about 1/2", even more preferably about 3/8".

The formation of the additive component into a pellet or tablet is dependent upon the mixture of materials contained therein. For example, when the additive component contains a sufficient amount of a dispersing agent or a mixture of dispersing agents, the dispersing agent or mixture also may function as a binder, thereby allowing the component to be molded or compressed directly into the form of a pellet or tablet. If the additive component does not compact well, a binder must be added to the additive component in order to mold or compress it into a pellet or tablet. Suitable binders include, for example, polyvinyl pyrrolidone, sodium acrylate, sodium polyacrylate, carboxymethylcellulose, sodium carboxymethylcellulose, corn starch, microcrystalline cellulose, propylene glycol, ethylene glycol, sodium silicate, potassium silicate, methacrylate/acrylate copolymers, sodium lignosulfonate, sodium hydroxypropylcellulose, preferably hydroxyethylcellulose, and water.

Preferably, the additive component to be molded or compressed into a pellet or tablet further comprises a die release agent. Suitable die release agents include, for example, calcium stearate, magnesium stearate, zinc stearate, stearic acid, propylene glycol, ethylene glycol, polyethylene glycol, polypropylene glycol, polyoxypropylene-polyoxyethylene block copolymers, microcrystalline cellulose, kaolin, attapulgite, magnesium carbonate, fumed silica, magnesium silicate, calcium silicate, silicones, mono- and dicarboxylic acids and corn starch.

To form a controlled release additive composition, the polymeric coating may be applied to the additive composition core by spray coating, microencapsulation or any other coating technique well known to practitioners in the art. In one embodiment, the polymeric coating is an aqueous dispersion latex which is applied to the additive core pellet or tablet by drum or pan coating. The amount of coating to be applied to the additive core is dependent upon the desired controlled release characteristics of the resulting coated tablet or pellet. An increase in the amount of coating will result in a decrease of the rate of release of the additive component. Generally, the weight percent of the coating is from about 1.0 to about 40.0% based on the total weight of the additive tablet, for example, from about 2% to about 20% by weight or about 3% to about 15% by weight. In one embodiment, the coatings of the controlled release additive compositions employed in cooling towers may be about 4% to about 10%, for example, about 8% by weight of the controlled release additive compositions.

In one broad embodiment, a method is provided for maintaining an effective concentration of at least one additive component in an open circulating cooling water system. The method includes steps of placing a controlled release additive composition, such as the ones described herein, in contact with the open circulating cooling water or aqueous coolant.

The following non-limiting examples illustrate certain aspects of the present invention.

Example 1

The release characteristics of a controlled release additive composition are tested as follows.

A tank with twenty (20) gallons of tap water is provided, together with a recirculating heater to give mixing and temperature control. The temperature is set to 80° F. Once this temperature is reached, a container, designed to hold the coated tablets and to allow the water to contact the tablets in the container, is filled with 200 grams of the coated tablets and is placed in the tank in contact with the water. The water is recirculated between the tank and the heater at a rate of about 1 gallon per minute. The water is maintained at a temperature of 80° F. Water samples are collected at regular intervals over a 100 hour period and are measured for nitrite, nitrate and molybdate content.

The percent release with time for each ingredient is calculated as the ratio of measured concentration and expected concentration at full release.

Example 2

Cummins Filtration DCA-4+ tablets are used as an additive component for testing. The tablets are of about 1 gram in weight and about 8 to about 15 kps in hardness. A conventional drum coater is used for coating.

For coating the DCA-4+ tablets, the tablets are placed onto the rotating pan inside the drum coater. While the pan is being rotated, a commercially available dispersion of a vinyl acetate-ethylene-vinyl chloride terpolymer, sold under the trademark Airflex 728, is pumped and sprayed through a nozzle onto the surfaces of the tablets. The spray rate and spray pattern is controlled to give a good mist of polymer droplets.

At the same time, through a very slightly reduced pressure, a stream of warm air at about 40° C. is passed through the coating chamber to remove the water vapor from the polymer mist (or small droplets), before and after they reach the surfaces of the tablets.

With time, the polymer gradually forms a layer of coating on the tablets. After all the polymer dispersion is sprayed to reach the desired thickness of coating, the resulting coated tablets are allowed to stay on the rotating pan for a few more minutes, then are decanted from the pan into a container for storage.

Example 3

DCA-4+ tablets coated with a terpolymer including units of vinyl acetate, butyl acrylate, and vinyl neoundecanoate are made in a manner substantially similar to that described in Example 2.

Example 4

DCA-4+ tablets coated with a terpolymer including units of vinyl acetate, butyl acrylate, and vinyl neopentanoate are made in a manner substantially similar to that described in Example 2.

Example 5

DCA-4+ tablets coated with a terpolymer including units of vinyl acetate, butyl acrylate, and vinyl neohexanoate are made in a manner substantially similar to that described in Example 2.

Example 6

DCA-4+ tablets coated with a terpolymer including units of vinyl acetate, butyl acrylate, and vinyl neoheptanoate are made in a manner substantially similar to that described in Example 2.

Example 7

DCA-4+ tablets coated with a terpolymer including units of vinyl acetate, butyl acrylate, and vinyl neooctanoate are made in a manner substantially similar to that described in Example 2.

Example 8

DCA-4+ tablets coated with a terpolymer including units of vinyl acetate, butyl acrylate, and vinyl neononanote are made in a manner substantially similar to that described in Example 2.

Examples 9-15

Using the protocol and conditions as described above in Example 1, coated tablets from each of Examples 2 through 8 are tested.

In each test, the ingredients are released gradually with time from the inner DCA-4+ tablet core into the test solution. Furthermore, the release rates for the additives are inversely proportional to the percentages or amounts of coatings on the tablets.

These tests demonstrate that the coatings tested are useful in controlled release coolant additive compositions.

Each of the patents and publications identified herein is hereby incorporated in its entirety herein by reference.

While this invention has been described with respect to various specific examples and embodiments, it is to be understood that the invention is not limited thereto and that it can be variously practiced with the scope of the following claims.

What is claimed is:

1. A method of releasing an additive composition into an open circulating cooling water system comprising placing a controlled release additive composition in contact with an aqueous coolant present in an open circulating cooling water system, the controlled release additive composition comprising:
   a core comprising an additive component effective as a water treatment in an aqueous coolant of an open circulating cooling water system; and
   a coating substantially surrounding the core and effective to slow the release of the additive component into an aqueous coolant in the open circulating cooling water system, the coating being insoluble in the aqueous coolant in the open circulating cooling water system, and including a polymeric component selected from the group consisting of (1) polymers including units from vinyl acetate, ethylene and vinyl chloride; (2) polymers including units from vinyl acetate, an acrylate ester, and at least one monomer selected from the group consisting of vinyl neopentanoate, vinyl neohexanoate, vinyl neoheptanoate, vinyl neooctanoate, vinyl neononanoate and vinyl neoundecanoate; and (3) combinations thereof.

2. The method of claim 1, wherein the polymeric component is selected from the group consisting of polymers including units from vinyl acetate, ethylene and vinyl chloride, and combinations thereof.

3. The method of claim 2, wherein the weight percent of the coating is about 1% to about 40% based on the total weight of the controlled release additive composition.

4. The method of claim 1, wherein the polymeric component is selected from the group consisting of polymers including units from vinyl acetate, an acrylate ester, and at least one monomer selected from the group consisting of one of vinyl neopentanoate, vinyl neohexanoate, vinyl neoheptanoate, vinyl neooctanoate, vinyl neononanoate and vinyl neoundecanoate.

5. The method of claim 4, wherein the weight percent of the coating is about 1% to about 40% based on the total weight of the controlled release additive composition.

6. A method of releasing an additive composition into an open circulating cooling water system of a cooling tower comprising:
   placing a controlled release additive composition in contact with an aqueous coolant present in an open circulating cooling water system of a cooling tower, the controlled release additive composition comprising a core comprising an additive component effective as a water treatment in an aqueous coolant of the open circulating cooling water system of the cooling tower; and a coating substantially surrounding the core and effective to slow the release of the additive component into the aqueous coolant in the open circulating cooling water system, the coating being insoluble in the aqueous coolant in the open circulating cooling water system of the cooling tower and including a polymeric component selected from the group consisting of (1) polymers including units from vinyl acetate, ethylene and vinyl chloride, (2) polymers including units from vinyl acetate, an acrylate ester, and at least one monomer selected from the group consisting of vinyl neopentanoate, vinyl neohexanoate, vinyl neoheptanoate, vinyl neooctanoate, vinyl neononanoate and vinyl neoundecanoate, and (3) combinations thereof.

7. The method of claim 6, wherein the polymeric component is selected from the group consisting of polymers including units from vinyl acetate, ethylene and vinyl chloride, and combinations thereof.

8. The method of claim 6, wherein the polymeric component is selected from the group consisting of polymers including units from vinyl acetate, an acrylate ester, and at least one monomer selected from the group consisting of vinyl neopentanoate, vinyl neohexanoate, vinyl neoheptanoate, vinyl neooctanoate, vinyl neononanoate and vinyl neoundecanoate.

9. The method of claim 6, wherein the coating of the composition is insoluble over a temperature range of about 70 degrees Fahrenheit to about 150 degrees Fahrenheit.

10. The method of claim 6, wherein the core includes a microbiocide.

* * * * *